US009785515B2

(12) United States Patent
Gaza et al.

(10) Patent No.: US 9,785,515 B2
(45) Date of Patent: *Oct. 10, 2017

(54) DIRECTED BACKUP FOR MASSIVELY PARALLEL PROCESSING DATABASES

(71) Applicant: International Business Machines Corporation, Armonk, NY (US)

(72) Inventors: Lukasz Gaza, Jankowice (PL); Artur M. Gruszecki, Kraków (PL); Tomasz Kazalski, Kraków (PL); Konrad K. Skibski, Zielonki (PL); Tomasz Stradomski, Bę dzin (PL)

(73) Assignee: International Business Machines Corporation, Armonk, NY (US)

( * ) Notice: Subject to any disclaimer, the term of this patent is extended or adjusted under 35 U.S.C. 154(b) by 34 days.

This patent is subject to a terminal disclaimer.

(21) Appl. No.: 14/614,847

(22) Filed: Feb. 5, 2015

(65) Prior Publication Data

US 2015/0370651 A1 Dec. 24, 2015

Related U.S. Application Data

(63) Continuation of application No. 14/312,723, filed on Jun. 24, 2014.

(51) Int. Cl.
*G06F 17/30* (2006.01)
*G06F 11/14* (2006.01)
*H04L 29/08* (2006.01)

(52) U.S. Cl.
CPC ...... *G06F 11/1458* (2013.01); *G06F 11/1464* (2013.01); *G06F 17/30073* (2013.01); *H04L 67/10* (2013.01); *H04L 67/1095* (2013.01)

(58) Field of Classification Search
None
See application file for complete search history.

(56) References Cited

U.S. PATENT DOCUMENTS 6,658,589 B1* 12/2003 Taylor ................. G06F 11/1458
707/999.202
6,944,788 B2* 9/2005 Dinker ................. G06F 11/2041
714/11

(Continued)

OTHER PUBLICATIONS

Yan et al., "An Implementation of Semi-synchronous Remote Mirroring System for SANs", GCC 2004 Workshops, LNCS 3252, pp. 229-237, 2004, Springer-Verlag Berlin Heidelberg.*

(Continued)

*Primary Examiner* — Bai D. Vu
(74) *Attorney, Agent, or Firm* — David Zwick

(57) ABSTRACT

Creating a data backup of data on a first computer system to restore to a second computer system, each of the first and second computer system including one or more nodes, each node configured to manage a subset of the data. Receiving, by the first computer system, identification of data to back up and node configuration information for the second computer system. Creating, by the first computer system, a backup of the data from the one or more nodes of the first computer system, configured in accordance with the node configuration information of the second computer system, such that the backed up data is directly manageable by the one or more nodes of the second computer system.

6 Claims, 4 Drawing Sheets

(56) References Cited

U.S. PATENT DOCUMENTS

| | | | |
|---|---|---|---|
| 7,921,080 | B2 | 4/2011 | Taylor |
| 8,799,284 | B2 | 8/2014 | Jagtiani et al. |
| 9,183,268 | B2 | 11/2015 | Novick et al. |
| 9,563,648 | B2 | 2/2017 | Welton et al. |
| 2005/0108593 | A1* | 5/2005 | Purushothaman .. G06F 11/2028 714/4.11 |
| 2012/0023069 | A1 | 1/2012 | Kaijima et al. |
| 2013/0254165 | A1 | 9/2013 | Pafumi et al. |

OTHER PUBLICATIONS

Fan et al., "DiskReduce: RAID for data-intensive scalable computing", Proceedings of the 4th Annual Workshop on Petascale Data Storage, pp. 6-10, 2009, ACM.*

IBM: List of IBM Patents or Patent Applications Treated as Related (Appendix P).

Gaza et al, "Directed Backup for Massively Parallel Processing Databases", U.S. Appl. No. 14/312,723, filed Jun. 24, 2014, 35 pages.

Alvarez et al., "Database recovery on same cluster but with one less node," Vertica Community, p. 1-3, Products: Restore, Backup, and Recover Community, HP, https://community.vertica.com/vertica/topics/database_recovery_on_same_cluster_but_with_one_less_node, Accessed on: Jun. 18, 2014.

Couchbase, "Couchbase Server: Backup and Restore," Couchbase Manual 2.0, p. 1-13, http://docs.couchbase.com/couchbase-manual-2.0/#backup-and-restore, Accessed on: Jun. 18, 2014.

Davies et al., "Restoring a Backup," MySQL® Clustering, Mar. 20, 2006, Ch. 3. Backup and Recovery, MySQL Press, Available at Safari Books Online, http://my.safaribooksonline.com/book/databases/mysql/0672328550/backup-and-recovery/ch03lev1sec2, Accessed on: Jun. 18, 2014.

IBM, "IBM PureData System for Analytics (powered by Netezza technology) V7.0.3 documentation," IBM Corporation, Last updated: Jul. 31, 2013, Relevant Sections: Netezza hardware components, Table size and storage space, Manage data slices, Compression in backups and restores, http://www-01.ibm.com/support/knowledgecenter/SSULQD_7.0.3/com.ibm.nz.welcome.doc/doc/welcome.html?lang=en, Accessed on: Jun. 23, 2014.

Turbo et al., "How to migrate data from Cassandra cluster of size N to a different cluster of size N+/-M," Stack Overflow, Jul. 21, 2011, p. 1-2, http://stackoverflow.com/questions/6781132/how-to-migrate-data-from-cassandra-cluster-of-size-n-to-a-different-cluster-of-s, Accessed on: Jun. 18, 2014.

Vertica, "Restoring Object-Level Backups," HP Vertica Analytics Platform Version 7.0.x Documentation, p. 1-3, Hewlett-Packard Development Company, L.P., https://my.vertica.com/docs/7.0.x/HTML/index.htm#Authoring/AdministratorsGuide/BackupRestore/RestoringObjectLevelBackups.htm, Accessed on: Jun. 18, 2014.

* cited by examiner

DIRECTED BACKUP FOR MASSIVELY PARALLEL PROCESSING DATABASES

CROSS REFERENCE

The present application is a continuation of and claims priority under 35 U.S.C §120 of U.S. patent application Ser. No. 14/312,723, filed on Jun. 24, 2014, which is incorporated herein by reference in its entirety.

BACKGROUND

The present disclosure relates generally to data warehousing, analytics and appliances and more particularly to Massively Parallel Processing (MPP) database backup/restore/migration optimization using directed backup.

An MPP database partitions data across multiple servers, or nodes, with each node having its own processor and memory to process data locally. Each node server controls a portion of the database and a portion of the database storage. All communication is via an "interconnect" as there is no disk-level sharing. There is also no contention to the data since it is a 'shared-nothing' architecture.

An MPP database may be controlled by a "host" processor with its own operating system, storage and memory. The host system does not necessarily store user data, but rather partitions the user data across multiple nodes to achieve data and processing parallelism. Typically, an MPP host processor partitions a database among the nodes and assigns work among the node servers.

SUMMARY

Embodiments of the present invention disclose a method, computer program product, and system for creating a data backup of data on a first computer system to restore to a second computer system, each of the first and second computer system including one or more nodes, each node configured to manage a subset of the data. Receiving, by the first computer system, identification of data to back up and node configuration information for the second computer system. Creating, by the first computer system, a backup of the data from the one or more nodes of the first computer system, configured in accordance with the node configuration information of the second computer system, such that the backed up data is directly manageable by the one or more nodes of the second computer system.

BRIEF DESCRIPTION OF THE SEVERAL VIEWS OF THE DRAWINGS

Features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
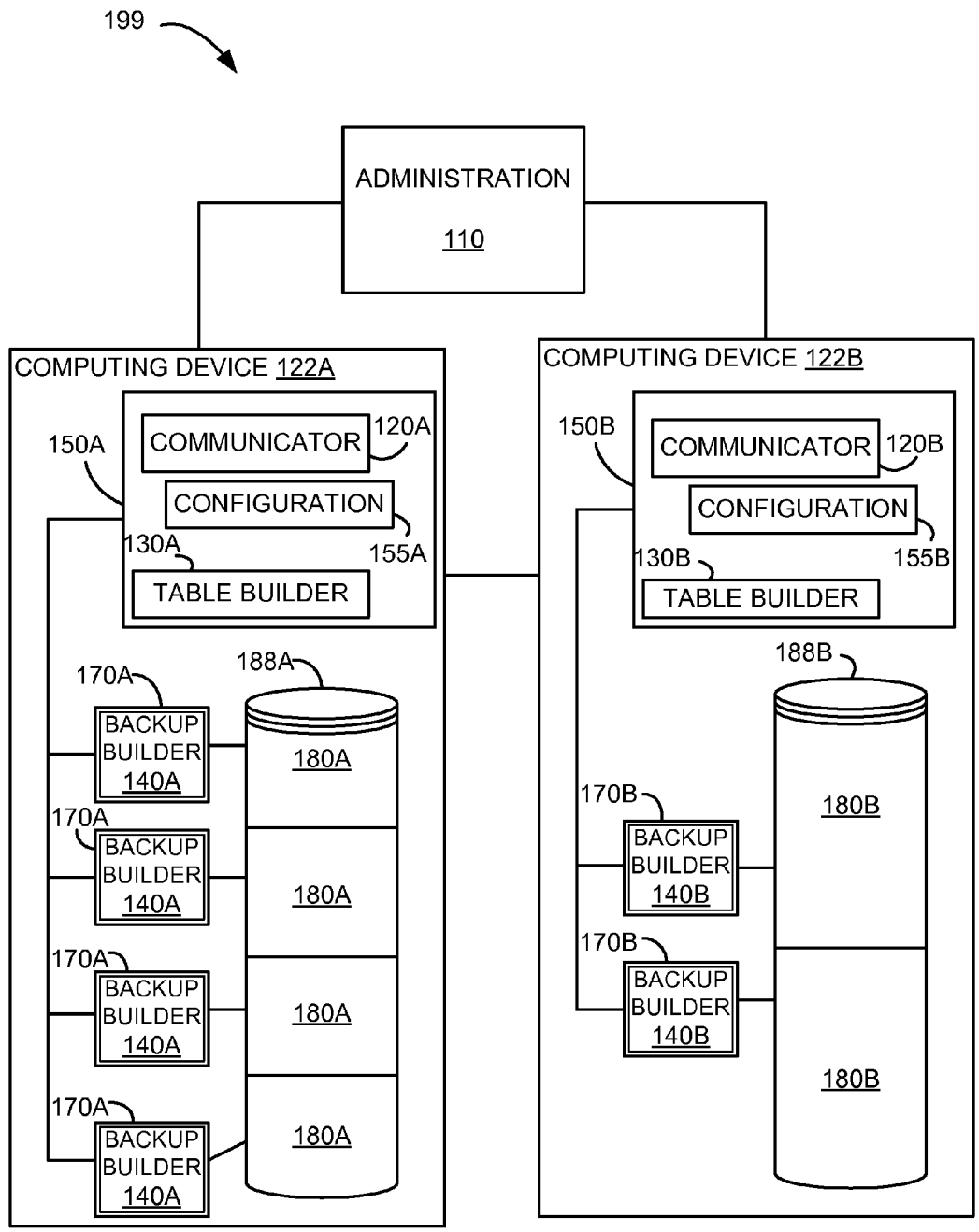
FIG. 1 illustrates a functional block diagram of an exemplary MPP environment, in accordance with an embodiment of the disclosure.

The size of the average data warehouse is continually increasing and showing no signs of slowing down, with multi-terabyte sized data warehouses becoming common. The increased store of data may increase the demand to generate intelligence from the data. As the amount of data continues to grow, businesses become more dependent on the availability of the data. Unfettered data availability may be crucial in business-critical situations where organizations make real-time decisions and suffer real-world costs when data is unavailable. Lack of data availability may cause organizations to lose time, money, and competitive advantage. Backing up databases, and restoring them on a failure, may cause interruption to an application or may interrupt an entire system for a window of time while the application or system is quiesced to back data up or while the application or system restores the data. It may therefore be crucial to a business to minimize the window of time data is unavailable and, therefore, impacting an application's or and system's performance.

Data warehousing may be performed on a specialized appliance, with an integrated set of servers, storage, operating system(s), database management systems, and software specifically pre-installed and pre-optimized for data warehousing. Alternatively, data warehousing may be performed with software-only systems promoted as easy to install on specific recommended hardware configurations. An exemplary data warehouse appliance, such as a Netezza® TwinFin™ or EMC® Greenplum®, may include a host server that subdivides the data among a plurality of nodes that manage the data. Each data warehouse appliance may include different host server software, node server software, and number of nodes, even for the same appliance vendor, due to software levels installed, appliance model, and hardware configuration.

A typical data warehouse backup scheme may assume the system being restored has a configuration of software and hardware that matches the system creating the backup. While these assumptions may expedite the backup preparation, they may lengthen the restore (or migration) window on the restoring system or, in the case of migration, the migrated to system if it has a different configuration. Both a restoring system and a migrated to system will hereinafter be referred to as "restoring system."

A restoring system typically decomposes the backup data received and re-partitions the data according to its configuration of software and hardware. Embodiments of the present disclosure may shorten the window of data unavailability for systems with mis-matched configurations by creating a backup that is specific to the configuration of the restoring system.

Exemplary embodiments of the disclosure are described using an asymmetric massively parallel processing appliance with a "two-tiered" system, the first tier being a symmetric multiprocessing (SMP) host that partitions a database and distributes work among a plurality of second tier processors which make up the massively parallel processing engine of the appliance, and where the primary processing work of the appliance is executed. Those of skill in the art will appreciate that other embodiments of the invention may be used to advantage for numerous other MPP appliances, and for non-appliance MPP system configurations with a two-tiered processing configuration.

FIG. 1 illustrates a functional block diagram of an exemplary MPP environment 199, in accordance with an embodiment of the disclosure. MPP environment 199 may include a plurality of two-tiered asymmetric massively parallel processing computing devices 122A, 122B and one or more administrations 110 for the computing devices 122. In certain embodiments, the computing devices 122 may be connected to each other either through a communication fabric, such as a bus architecture, or through a network such that the computing devices may directly communicate. The network may include the Internet, a local area network or other, wide area network or wireless network. The network and communication fabric may be implemented with any architecture designed for passing data and/or control information between processors (such as microprocessors, communications and network processors, etc.), system memory, peripheral devices, and any other hardware components within a system and may comprise copper wires, optical fibers, wireless transmission, routers, firewalls, switches, gateway computers, and/or edge servers, in accordance with embodiments of the invention.

Figure 4:
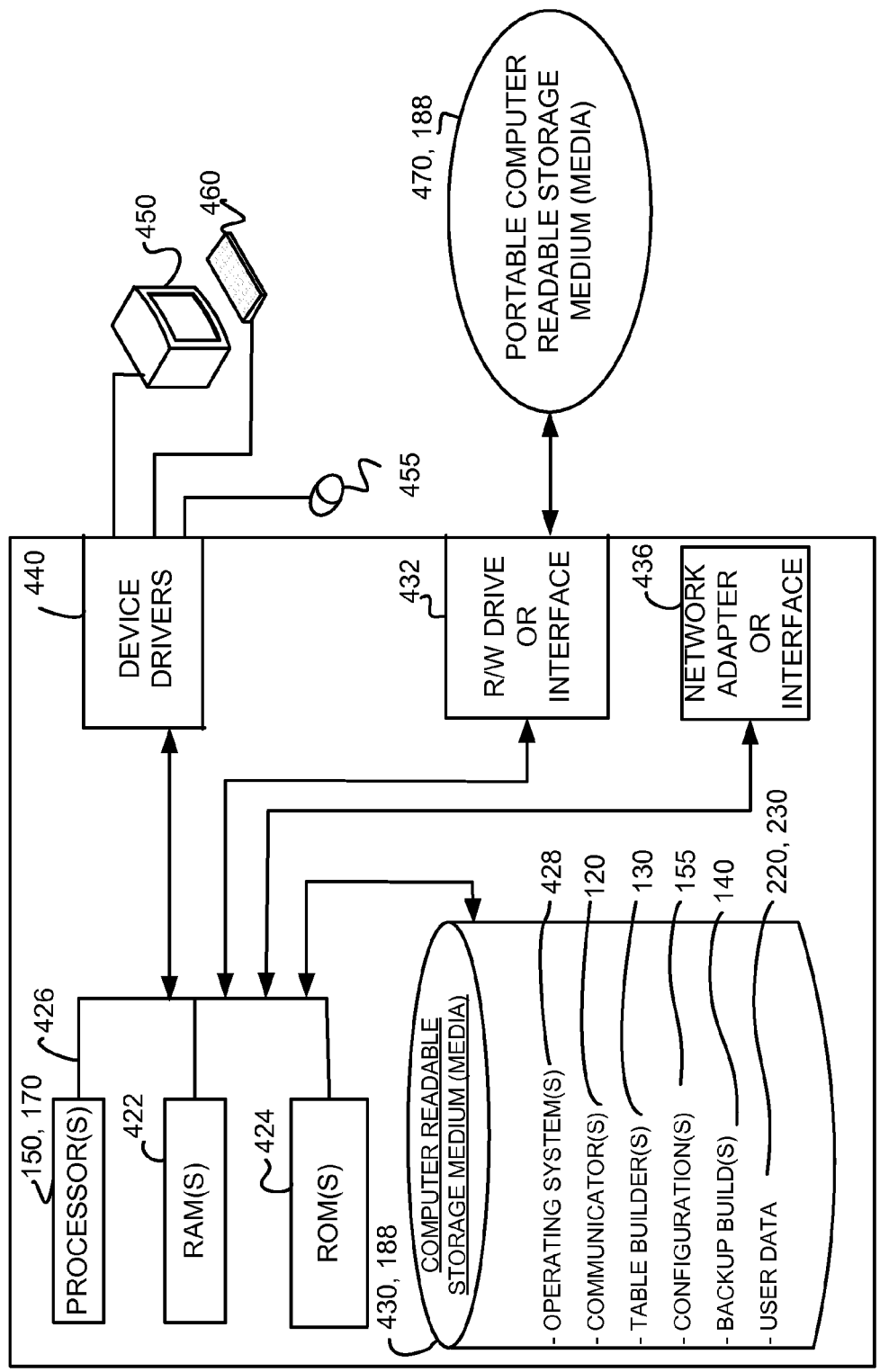
FIG. 4 depicts a block diagram of components of the computing device of an MPP environment, in accordance with an embodiment of the disclosure.

Each computing device 122 may include a first-tier server, or host server 150A, 150B, a plurality of second-tier servers, or node servers 170A, 170B, and one or more storage medium (media) 188A, 188B for user data, segmented into storage segments 180A, 180B, which may be stored, for example, on a computer readable storage medium, such as computer readable storage medium (media) 430 (FIG. 4) or portable computer readable storage medium (media) 470 (FIG. 4).

A node server 170 may include a dedicated memory, disk, bus, central processing unit, and a programmable disk controller. Each node server 170 may manage a storage segment 180 and the data stored in that storage segment 180. A node server 170 may be solely responsible for managing its associated storage segment 180. The plurality of node servers 170 in a computing device 122 may communicate with the host server 150 in the computing device, but share-nothing with the other node servers 170 in the computing device. The plurality of node servers 170 may operate in parallel and independently of one another.

Each host server 150 may include a communicator 120, a table builder 130, and configuration information, hereinafter "configuration", 155 of its computing device 122, and each node server 170 may include a backup builder 140, all of which may be stored, for example, on a computer readable storage medium, such as computer readable storage medium (media) 430 or portable computer readable storage medium (media) 470.

In various embodiments, the user data stored on storage media 188 may be a relational database. In a relational database, a table may organize the data about a single topic into rows and columns. For example, a database for a business would typically contain a table for customer information, which would store customer account numbers, addresses, phone numbers, and so on as a series of columns. Each single piece of data (such as the account number) is a field in the table. A column consists of all the entries in a single field, such as the telephone numbers of all the customers. Fields, in turn, are organized as records, which are complete sets of information (such as the set of information about a particular customer), each of which comprises a row.

In various embodiments, a host server 150 may partition user data among its node servers 170. As a relational database table is created or expanded and a row of user data is inserted into the relational database table, a host server 150 may pass the row of data to one of its plurality of node servers 170 to be managed. A host server 150 may partition user data by distributing a plurality of inserted rows among its plurality of node servers 170. In certain embodiments, a host server 150 may distribute the rows evenly among its node servers 170 in order to evenly partition the user data. In various embodiments, a host server 150 may utilize partitioning information, such as a hash function partition algorithm, acting on the data in one or more columns of an inserted row, to determine which of its node servers 170 will manage the row of data. The hash function utilized, as well as the column of data acted upon (or partitioning key), may be pre-defined in a host server 150 or may be configurable. The pre-defined or configured hash function and column may be maintained in configuration 155.

In various embodiments, a node server 170 may receive a row of user data from its host server 150 to be written to the storage segment 180 managed by that node server 170. In certain embodiments, a node server 170 may compress the user data prior to writing it to its storage segment 180. The compression algorithm used by a node server 170 may be pre-defined or may be configurable. The pre-defined or configured compression algorithm may be maintained in the configuration 155 of its host server 150. In certain embodiments, a node server 170 may allocate a fixed length block of storage, on its storage segment 180, when a new row is received or when a previously allocated block of storage for a row on its storage segment 180 fills. The size of the fixed length allocation block may be pre-defined or may be configurable. The pre-defined or configured size of the fixed length allocation block may be maintained in the configuration 155 of its host server 150.

In various embodiments, administration 110 may communicate with a communicator 120 on a host server 150 to pass commands and configurable fields. The configurable fields, such as hash function to be used for partitioning, column to hash, compression algorithm, and size of the fixed length allocation block, may be received by the communicator, for example communicator 120A and stored in the exemplary configuration 155A, to be used by the exemplary host server 150A and exemplary node servers 170A when partitioning data and writing data to exemplary storage segments 180A. A configuration 155 may also include the number of node servers 170 on its computing device 122, a library of hash functions, and a library of compression algorithms.

Commands passed by administration 110 to a communicator 120 may include, for example, commands to create a backup of a table within a database, or a backup of an entire database, stored in the storage media 188 of that computing device 122. The backup commands may, in various embodiments, include a "directed backup" command that indicates a specific computing device 122. For example, communicator 120A may receive a directed backup command to create a backup of some or all of its data for computing device 122B. Computing device 122A, in creating the backup that is directed to computing device 122B, may create the backup using the configuration 155B of computing device 122B.

In order to create a directed backup, the host server 150 creating the directed backup may need the configuration 155 of the computing device 122 for which the backup is being directed. In various embodiments in which the computing devices 122 communicate directly through a communications fabric or a network, administration 110 may include the address of the computing device 122, to which the backup is directed, in the directed backup command. Communicator 120 receiving the directed backup command, for example communicator 120A, may in certain embodiments utilize the supplied address, for example the address of computing device 122B, to request the configuration 155B from communicator 120B. Communicator 120B may respond to the request by passing the configuration 155B to communicator 120A.

In various embodiments in which an exemplary computing device 122A, creating a directed backup for an exemplary computing device 122B, can not communicate directly with computing device 122B through a communications fabric nor a network, the administration 110 may issue a "create configuration" command to computing device 122B. In various embodiments, the create configuration command may include an address of a portable storage media such as portable computer readable storage medium (media) 470. Exemplary communicator 120B may copy the configuration 155B to the portable storage media 470. In certain embodiments, the address included in the create configuration command may address storage or a storage medium, such as computer readable storage medium (media) 430, that is accessible to both the exemplary computing device 122A, creating the backup, and the exemplary computing device 122B, copying configuration 155B to the addressed storage. In the various embodiments in which the computing devices 122 can not directly communicate, administration 110 may pass the configuration 155, for example 155B, resulting from a create configuration command, along with the directed backup command to the communicator 120, for example communicator 120A, on exemplary computing device 122A creating the backup. In certain embodiments, the portable storage medium (media) 470 may be physically moved from exemplary computing device 122B to exemplary computing device 122A before a directed backup command is issued by administration 110 to computing device 122A. The directed backup command may include the address of the portable storage medium (media) 470. Administration 110 may also include a storage address on a directed backup command in embodiments in which the storage or storage medium (media) 430 that includes the copied configuration 155B, is accessible to computing device 122A.

In other embodiments, computing devices 122A, 122B may be connected to a configuration service, such as a web service through a network, which maintains a copy of the configuration 155A, 155B of each computing device 122 utilizing the service. The network may include the Internet, a local area network or other, wide area network or wireless network. The network and communication fabric may be implemented with any architecture designed for passing data and/or control information between processors (such as microprocessors, communications and network processors, etc.), system memory, peripheral devices, and any other hardware components within a system and may comprise copper wires, optical fibers, wireless transmission, routers, firewalls, switches, gateway computers, and/or edge servers, in accordance with embodiments of the invention.

In various embodiments which utilize a configuration service, communicator 120A may obtain the configuration 155B of computing device 122B from the configuration service, using the address of computing device 122B, or a configuration service token representing computing device 122B received with the directed backup command.

A backup created for a specific computing device 122 may shorten the window of time needed to restore (or migrate) the database on the specified computing device 122, because the backup may already be partitioned, formatted, and compressed using the hash functions, columns, number of node servers 170, allocated block size, and compression algorithms of the restoring computing device 122. A restoring computing device 122 may simply distribute the received data to its node servers 170, without any further processing.

In various embodiments, a communicator 120 receiving a directed backup command may pass a received configuration 155 to the node servers 170 in its computing device 122, along with a signal to create a backup of any user data, managed by the node server 170, for the database or table being backed up. Each node server's 170 backup builder 140 may build a directed backup for each row of user data, to be backed up, that it manages. A backup builder 140 may build its directed backup row in its node server 170 workspace. In various embodiments, a backup builder 140 may read each row of the table or database to be backed up from the storage segment 180 managed by that node server 170. A backup builder 140 may hash the row using the hash algorithms and columns provided in the passed configuration 155, place the row of data into blocks matching the allocated block size provided in the passed configuration 155, and compress the data in the blocks using the compression algorithms provided in the passed configuration 155. Backup builder 140 may execute in parallel with the other backup builders 140 in the same computing device 122.

A backup builder 140 may also identify which node server 170, on the restoring computing device 122 should manage the row, thus allowing the re-partitioning of the user data to occur in parallel, on the plurality of node servers 170 of the backup creating computing device 122, rather than serially on the host server 150 of the restoring computing device 122. In various embodiments, a backup builder 140, on the backup creating computing device 122, may receive a partition function, in the received configuration 155. In certain embodiments, the received partition function may evenly distribute the data among the plurality of node servers 170 on the restoring computing device 122. The execution of an even distribution partition function may differ depending on the number of node servers 170 on the backup creating computing device 122 versus the number of node servers 170 on the restoring computing device 122, as identified in the passed configuration 155. In an exemplary embodiment, in which the computing device 122 creating the backup has half the number of node servers 170 as the restoring computing device 122, and data is to be distributed evenly among the node servers 170 on the restoring computing device 122, backup builder 140 may re-partition data from an exemplary node server 170 #3 with half the rows identified to be managed by node server 170 #3 on the restoring computing device 122 and half the rows identified to be managed by node server 170 #6 on the restoring computing device 122 (node server #*2). For an exemplary embodiment, in which the computing device 122 creating the backup has more node servers 170 than the restoring computing device 122, a backup builder 140, may re-partition the rows using the modulo value of the node server 170 number divided by the number of node servers 170 on the restoring computing device 122.

In other embodiments, a backup builder 140, on the backup creating computing device 122, may receive a partition function, in the passed configuration 155, which utilizes a hash algorithm to re-partition the data. Backup builder 140, on the backup creating computing device 122, may utilize the value resulting from the passed hash algorithm combined with the distribution embodiments above to distribute the rows among the node servers 170 of the restoring computing device 122. The newly blocked and compressed data rows, along with their identified node server 170 on the restoring computing device 122 may be passed to table builder 130.

In certain embodiments, a node server 170 may maintain control information for the user data it manages in its storage segment 180, such as minimum and maximum data values for each allocated block. A backup builder 140, on the backup creating computing device 122, may calculate a new minimum and maximum data value for any re-blocked data and may pass the recalculated values, with the data rows, to table builder 130.

Allowing each node server 170, in a backup creating computing device 122, to prepare, in parallel, backup data specifically for the configuration of the restoring computing device 122 advantageously reduces the window of time the application or system may be unavailable. Re-partitioning, formatting, and compressing the data specifically for the restoring computing device 122, in parallel on a plurality of node servers 170 may prevent a serial re-partition, re-format, and re-compression of the data on the host server 150 of the restoring computing device 122.

Table builder 130A, 130B, in various embodiments, may build a complete backup table by consolidating the rows of user data received from each backup builder 140. Table builder 130, on the backup creating computing device 122, may transmit the backup table to the restoring computing device 122 identified in the directed backup command. The backup table may include each of the received blocked and compressed rows of data, minimum and maximum data values of each block of data in the row, and the identified node server 170 on the restoring computing device 122 that is to manage the row of data. A table builder 130 may organize the backup table by the identified node server 170, such that the restoring computing device 122 may easily distribute the data rows among its node servers 170, with each node server 170 on the restoring computing device 122 writing its data rows to its storage segment 180, without any further processing. A table builder 130 may additionally compress the backup table, before transmission to the restoring computing device 122, in order to minimize the amount of data transferred and, subsequently, to reduce the data transfer time. Table builder 130, on the backup creating computing device 122, may in various embodiments, utilize a compression algorithm from the received configuration 155.

In certain embodiments, a backup creating computing device 122 may create a plurality of compressed backup tables to be stored on a computer readable storage medium (media) 430 or portable computer readable storage medium (media) 470, in anticipation of a future restore, without actually restoring any computing devices 122. The storage media 430, 470 storing the created, compressed backup tables may include storage media 430, 470 on the backup creating computing device 122A, on the restoring computing device 122B, on a third computing device, or in the cloud. This may occur, for example when the backup creating computing device, for example computing device 122A, is a production system with an exemplary restoring computing device 122B that may not include a large enough storage media 188B to maintain the backup data of the production system while also performing other functions. For exemplary environments such as these, the backup creating computing device 122A may, in certain embodiments, create and store a compressed backup table using its own configuration 155A, as well as create and store one or more compressed backup tables using configurations 155B for the one or more exemplary restoring computing devices 122B.

In embodiments in which compressed backup tables are created and stored on storage media 430, 470, the appropriate stored backup table may be quickly loaded to the appropriate restoring computing device 122 without waiting for a backup to be created. In the above example, for a data corruption failure on the production computing device 122A, the restoring computing device 122 may be the production computing device 122A, which may restore the data from the stored, compressed backup table created previously for its configuration 155A. For a hardware failure on the production computing device 122A, the restoring computing device 122 may be the restoring computing device 122B, which may restore the data from the stored, compressed backup table created previously for its configuration 155B.

Computing device 122 represents computing devices, systems or environments, and may be laptop computers, notebook computers, personal computers (PC), desktop computers, tablet computers, thin clients, mobile phones or any other electronic devices or computing systems capable of performing the required functionality of embodiments of the disclosure. Computing device 122 may include internal and external hardware components, as depicted and described in further detail with respect to FIG. 4. In other various embodiments of the present disclosure, computing device 122 may represent a computing system utilizing clustered computers and components to act as a single pool of seamless resources. In general, computing device 122 is representative of any programmable electronic devices or combination of programmable electronic devices capable of executing machine-readable program instructions in accordance with an embodiment of the disclosure.

Figure 2:
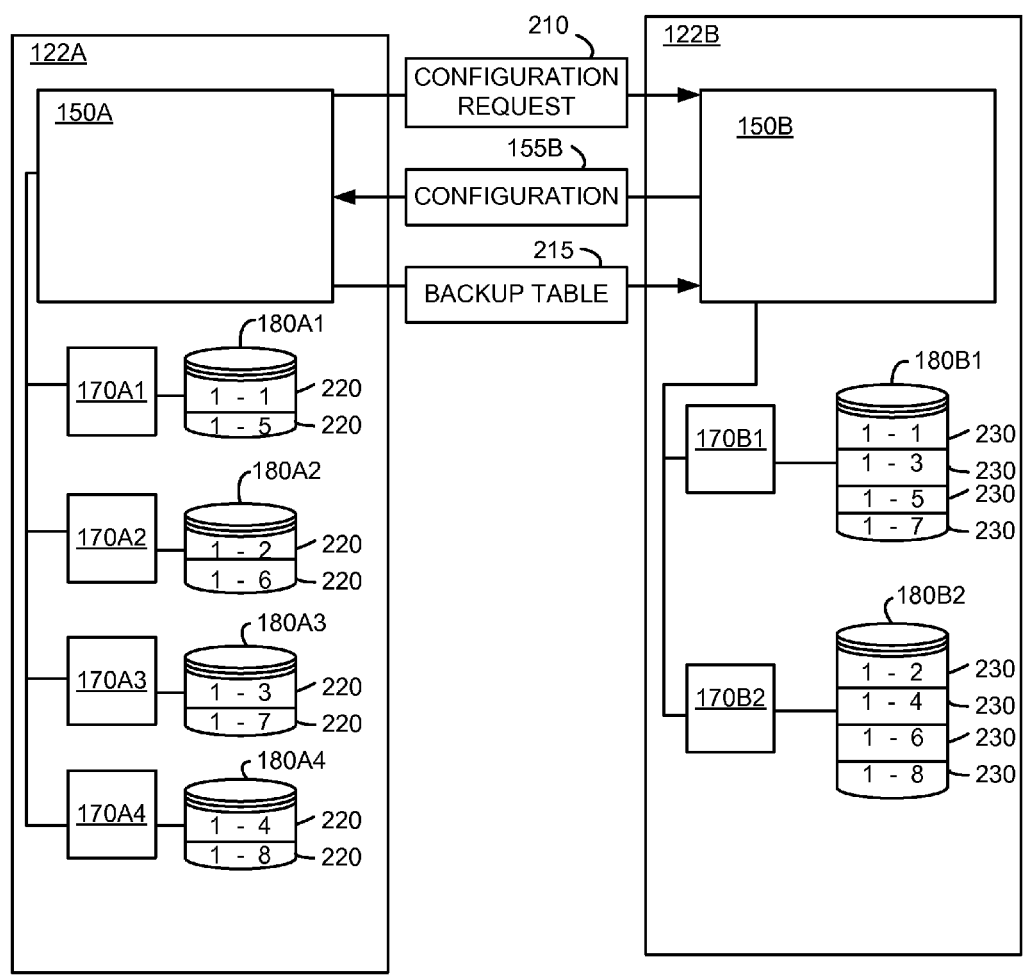
FIG. 2 illustrates an exemplary backup and restore, in accordance with an embodiment of the disclosure.

FIG. 2 illustrates an exemplary backup and restore, in accordance with an embodiment of the disclosure. In the exemplary embodiment, host server 150A, on computing device 122A, may receive a directed backup command for user data in a database table #1, the backup directed to computing device 122B. The exemplary database table #1 may be distributed evenly on computing device 122A among storage segments 180A1, 180A2, 180A3, and 180A4, the storage segments 180A managed by node servers 170A1, 170A2, 170A3, and 170A4 respectively. The user data 220, in storage segments 180A of backup creating computing device 122A, are depicted with the table number and row number of the user data as it may exist in the database table being backed up.

Communicator 120A, on host server 150A, may issue a request 210 for the configuration information of computing device 122B. Communicator 120B, on host server 150B, may respond with configuration 155B. Configuration 155B may be used by the node servers 170A1, 170A2, 170A3, 170A4 to build user data 230 rows specifically for the configuration 155B of computing device 122B. Table builder 130A in host server 150A may consolidate, order, and compress the backup table 215 and transmit the backup table 215 to communicator 120B in host server 150B. Host server 150B may distribute the data rows of the received backup table 215, to the node servers 170B1, 170B2, as identified with each row, to be written to their respective storage segments 180B1 and 180B2, without any further processing by the node servers 170B. As depicted, computing device 122B has half the number of node servers 170B as computing device 122A and the node servers 170A have re-partitioned the data rows accordingly.

Figure 3:
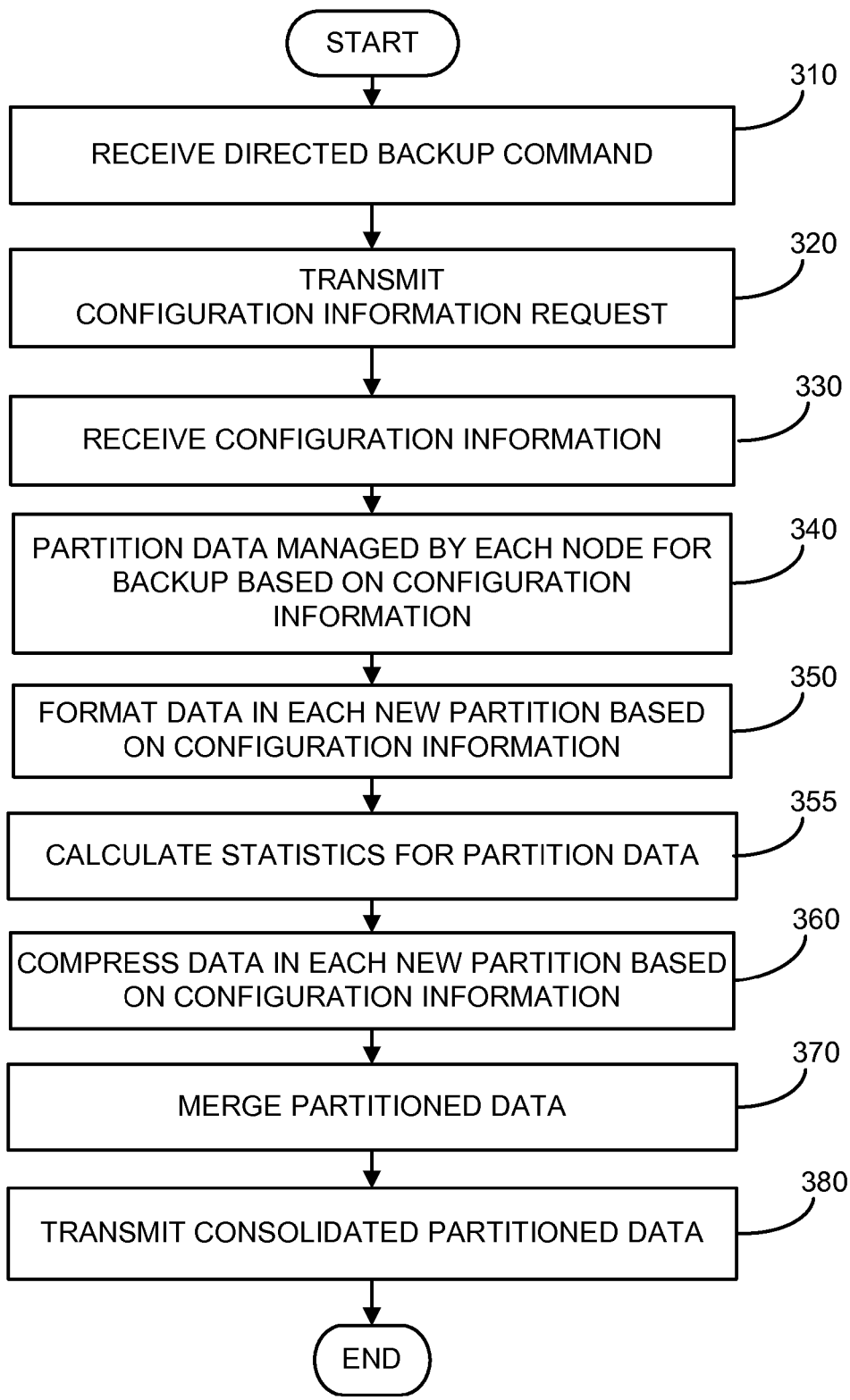
FIG. 3 is a flowchart illustrating the operation of a computing device creating a backup, in accordance with an embodiment of the disclosure.

FIG. 3 is a flowchart illustrating the operation of a computing device 122 creating a backup, in accordance with an embodiment of the disclosure. In various embodiments, communicator 120 may receive, at 310, a command from administration 110 to create a directed backup of a database or a directed backup of one or more tables within a database managed by its computing device 122. The command may include an address of another computing device 122, a restoring computing device, for which the backup is to be created. Communicator 120 on the backup creating computing device 122 may transmit, at 320, a configuration information request 210, to the communicator 120 of the restoring computing device 122 requesting the configuration information 155 of the restoring computing device 122. The configuration information 155 may be used by the backup creating computing device 122 to create a backup of its database and/or tables within its database, specifically configured for the restoring computing device 122. Communicator 120 on the backup creating computing device may, at 330, receive the configuration information 155 requested.

Communicator 120, in the backup creating computing device 122, may pass the configuration information 155 received to its node servers 170. The backup builder 140, in each of its node servers 170, may utilize the configuration information 155 received to partition, at 340, any user data, to be backed up, that is managed by that node server 170. The data may be partitioned for the restoring computing device 122, using the partition function received in the configuration information 155. The partition function may be an even distribution function or may be a distribution based on a provided hash algorithm and provided column or columns to hash. The newly partitioned data may identify the node server 170, on the restoring computing device 122, which is to manage the data when the data is restored on the restoring computing device 122.

After partitioning the data and identifying the node server 170 on the restoring computing device 122 to manage the data, backup builder 140, on the backup creating computing device 122, may, at 350, format the newly partitioned data, based on configuration information 155 received from the restoring computing device 122. The data may be formatted based on the characteristics of the storage segments 180 managed by the node server 170 on the restoring computing device 122. Backup builder 140, on the backup creating computing device 122, may, at 355, calculate and store low level statistics, such as minimum and maximum data values for the newly formatted partitioned data and may, at 360, compress the formatted data, based on a compression algorithm received in the configuration information 155, from the restoring computing device 122. The partitioned, formatted, and compressed data may be sent to backup creating computing device 122 table builder 130 for consolidation.

Because each backup creating computing device 122 node server 170 may run in parallel, partitioning, formatting, and compressing the data it manages, backup creating computing device 122 table builder 130 may, at 370, merge the plurality of partitioned, formatted, and compressed data it receives from each backup builder 140 to create a consolidated backup table, created specifically for the configuration of restoring computing device 122. Communicator 120, on the backup creating computing device 122, may, at 380, transmit the consolidated backup table to the communicator 120 on the restoring computing device 122.

FIG. 4 depicts a block diagram of components of a computing device 122 of the MPP environment 199 of FIG. 1, in accordance with an embodiment of the disclosure. It should be appreciated that FIG. 4 provides only an illustration of one implementation and does not imply any limitations with regard to the environments in which different embodiments may be implemented. Many modifications to the depicted environment may be made.

Computing device 122 can include one or more processors 150, 170, one or more computer-readable RAMs 422, one or more computer-readable ROMs 424, one or more computer readable storage medium 430, 188, device drivers 440, read/write drive or interface 432, and network adapter or interface 436, all interconnected over a communications fabric 426. Communications fabric 426 can be implemented with any architecture designed for passing data and/or control information between processors (such as microprocessors, communications and network processors, etc.), system memory, peripheral devices, and any other hardware components within a system.

One or more operating systems 428, communicators 120, table builders 130, configurations 155, backup builders 140, and user data 220, 230 are stored on one or more of the computer-readable storage medium 430, 188 for execution by one or more of the processors 150, 170 via one or more of the respective RAMs 422 (which typically include cache memory). In the illustrated embodiment, each of the computer readable storage medium 430, 188 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer readable storage medium that can store a computer program and digital information.

Computing device 122 can also include a R/W drive or interface 432 to read from and write to one or more portable computer readable storage medium 470, 188. Communicator 120, table builder 130, configuration 155, backup builder 140, and user data 220, 230 can be stored on one or more of the portable computer readable storage medium 470, 188, read via the respective R/W drive or interface 432, and loaded into the respective computer readable storage medium 430, 188.

Computing device 122 can also include a network adapter or interface 436, such as a TCP/IP adapter card or wireless communication adapter (such as a 4G wireless communication adapter using OFDMA technology). Communicator 120, table builder 130, configuration 155, backup builder 140, and user data 220, 230 can be downloaded to the computing device from an external computer or external storage device via a network (for example, the Internet, a local area network or other, wide area network or wireless network) and network adapter or interface 436. From the network adapter or interface 436, the programs are loaded into the computer readable storage medium 430, 188. The network may comprise copper wires, optical fibers, wireless transmission, routers, firewalls, switches, gateway computers, and/or edge servers.

Computing device 122 can also include a display screen 450, a keyboard or keypad 460, and a computer mouse or touchpad 455. Device drivers 440 interface to display screen 450 for imaging, to keyboard or keypad 460, to computer mouse or touchpad 455, and/or to display screen 450 for pressure sensing of alphanumeric character entry and user selections. The device drivers 440, R/W drive or interface 432, and network adapter or interface 436 can comprise hardware and software (stored in computer readable storage medium 430, 188 and/or ROM 424).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A method for creating a backup of a database on a first massively parallel processing (MPP) computer system to restore to a second MPP computer system, the method comprising:
   receiving, by the first MPP computer system, identification of data to back up and node server configuration information for the second MPP computer system, wherein the node server configuration information includes how the data is partitioned among the node servers of the second computer system, and wherein each of the first and second MPP computer systems includes its own database storage media segmented into storage segments, and a plurality of node servers, each node server configured to manage a respective storage segment and a subset of the database stored on its respective storage segment, and wherein partitioning of the database among the node servers of the first MPP computer system is different than the partitioning of the database among the node servers of the second MPP computer system; and
   creating, by the first MPP computer system, a backup of the identified data from the plurality of node servers of the first MPP computer system in accordance with the node server configuration information of the second MPP computer system, such that the backed up data is partitioned in accordance with the partitioning of the data among the node servers of the second MPP computer system and does not require a re-partitioning by the second MPP computer system for a restore of the data to the second MPP computer system.

2. The method according to claim 1, wherein receiving further comprises:
   receiving, by the first MPP computer system, an identifier for the second MPP computer system;
   transmitting to the second MPP computer system, by the first MPP computer system, a request for the node server configuration information; and
   receiving, by the first MPP computer system, the node server configuration information.

3. The method according to claim 2, further comprises:
   transmitting to the second MPP computer system, by the first MPP computer system, the backup of the data from the plurality of node servers of the first MPP computer system.

4. The method according to claim 1, wherein partitioning the data from each of the plurality of node servers of the first MPP computer system executes in parallel.

5. The method according to claim 1,
   wherein the node server configuration information for the second MPP computer system includes one or more of: an indication of a data storage format for data on the plurality of node servers of the second MPP computer system, and an indication of a data compression algorithm for data on the plurality of node servers of the second MPP computer system; and
   wherein creating further comprises one or more of: formatting the data from the plurality of node servers of the first MPP computer system, in accordance with the received indication of the data storage format; and compressing the data from the plurality of node servers of the first MPP computer system, in accordance with the received indication of the compression algorithm.

6. The method according to claim 5, wherein formatting the data from each of the plurality of node servers of the first MPP computer system executes in parallel, and/or compressing the data from each of the plurality of node servers of the first MPP computer system executes in parallel.

* * * * *